United States Patent [19]
Welch

[11] 3,815,113
[45] June 4, 1974

[54] FOOD TEMPERATURE MONITORING APPARATUS

[75] Inventor: Stanley B. Welch, Louisville, Ky.

[73] Assignee: General Electric Company, Louisville, Ky.

[22] Filed: Mar. 15, 1971

[21] Appl. No.: 124,325

[52] U.S. Cl. ............ 340/228 R, 340/233, 323/75 E, 307/252 F, 99/421 TP, 99/342, 73/352, 338/28
[51] Int. Cl. ............................................ F24c 15/00
[58] Field of Search ........ 340/227, 227.1, 233, 228, 340/333; 73/190 R, 190 H, 193 R, 193 A, 343 B, 352; 99/421 TP, 107, 342; 126/1 AA, 19 R, 190, 273 R; 307/310, 252 F; 317/132, 133.5; 338/28; 323/75 E

[56] References Cited
UNITED STATES PATENTS

| | | | |
|---|---|---|---|
| 2,657,580 | 11/1953 | Schroeder | 73/352 X |
| 2,816,997 | 12/1957 | Conrad | 73/352 UX |
| 2,858,699 | 11/1958 | Schofield et al. | 73/352 |
| 3,062,943 | 11/1962 | Eucer | 99/421 TP X |
| 3,267,731 | 8/1966 | Wharton | 73/352 X |
| 3,511,167 | 5/1970 | Holtkamp | 73/352 X |
| 3,594,751 | 7/1971 | Ogden et al. | 340/228 R |
| 3,606,792 | 9/1971 | Yoshimoto | 73/352 |
| 3,611,336 | 10/1971 | Chen | 70/352 |

OTHER PUBLICATIONS

G. E. Application Note, "The DBT – A Programmable Unijunction Transistor", W. R. Spofford, 12-29-67, pp. 1 and 7.

Primary Examiner—John W. Caldwell
Assistant Examiner—William M. Wannisky
Attorney, Agent, or Firm—Francis H. Boos, Jr.

[57] ABSTRACT

A solid-state, electrical meat thermometer design for monitoring the interior temperature of meat being cooked. The design is based on a programmable unijunction transistor used as a bridge detector that is combined in a circuit with a temperature sensing thermistor located in the tip of a meat probe that is adapted to be partially driven into the meat so as to monitor the interior temperature of the meat while it is being cooked, and then actuate a signal buzzer upon the reaching of a presettable temperature at the interior of the meat.

9 Claims, 3 Drawing Figures

INVENTOR.
STANLEY B. WELCH
BY Richard L. Caslin
HIS ATTORNEY

FOOD TEMPERATURE MONITORING APPARATUS

BACKGROUND OF THE INVENTION

The present invention relates to a tempreature monitoring apparatus, and particularly, such apparatus for monitoring the temperature of meat while it is being cooked in a baking or roasting oven.

The determination of the temperature of the interior of the meat while it is being cooked in the oven will provide a good indication of how well cooked the piece of meat is (i.e., RARE, MEDIUM, MEDIUM-RARE, or WELL DONE). This may be accomplished by the placement of a suitable temperature sensing probe into the meat. A simple type of probe would have a temperature indicating scale for reading the temperature therefrom. A better system is to use an electric meat thermometer system which is built into the oven as an accessory. It not only senses the temperature, but it provides an audible signal when the desired temperature has been reached. Such an electric system may also furnish a visual indication of the temperature being sensed by the thermometer. However, prior art electric meat thermometer systems have been characterized by the use of heavy meat probes, armored cables that join the probe to a plug-in connector in the oven wall and are difficult to keep clean, and rather expensive electrical circuit components.

The present invention improves upon the prior art by providing a simplified, low-cost, low-power solid state food temperature monitoring apparatus employing a programmable unijunction transistor to monitor the temperature condition of a meat probe that is adapted to be driven into the meat and to further actuate a signal buzzer upon reaching the desired temperature of the meat.

The principle object of the present invention is to provide a solid state, electric meat thermometer system based upon the use of a programmable unijunction transistor employed as a detector of a Wheatstone bridge having a low voltage supply.

A further object of the present invention is to provide an electric meat thermometer system of the class described with a miniaturized temperature sensing meat probe and an extra-flexible coaxial cable which is easy to keep clean in spite of repeated use.

A further object of the present invention is to provide a low-cost electric meat thermometer that is capable of operating in a low power circuit permitting the use of a relatively small sensing thermistor without excessive self-heating error, as well as the use of a small diameter sensing probe or meat probe.

A still further object of the present invention is to provide an electric meat thermometer system with a needle-like meat probe and a flexible coaxial cable with a high temperature, thermosetting, insulating sheath.

SUMMARY OF THE INVENTION

The present invention, in accordance with one form thereof, relates to a food temperature monitoring apparatus such as an electric meat thermometer system. The system includes means for connecting it to an electrical power source as well as means for establishing a reference level functionally related to a temperature at which an audible alarm is to be actuated. A food temperature sensing probe having a variable resistance temperature sensing element in the end thereof, is adapted to be inserted into the food which is to be cooked so as to measure the internal temperature thereof. Moreover, a solid state device responds to the temperature of the probe so that when the food reaches a predetermined temperature, the probe sensing the same triggers the solid state device which in turn actuates an audible signal.

BRIEF DESCRIPTION OF THE DRAWINGS

This invention will be better understood from the following description taken in conjunction with the accompanying drawings and its scope will be pointed out in the appended claims.

DESCRIPTION OF THE PREFERRED EMBODIMENTS

Figure 1:
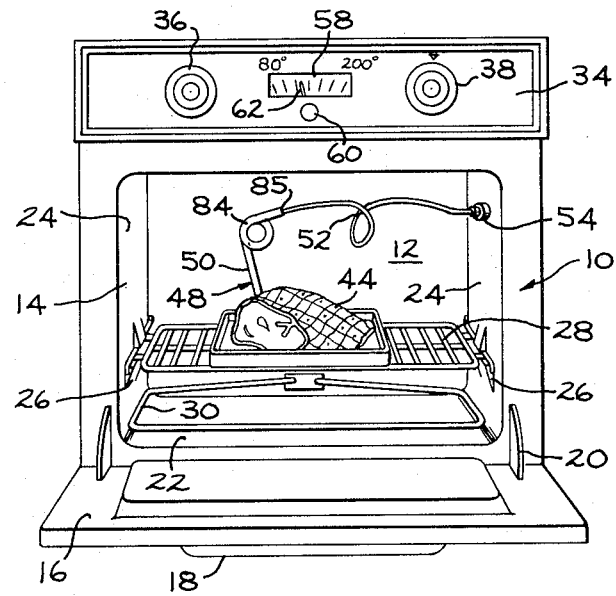
FIG. 1 is a front view of an electric, built-in, wall oven shown with the oven door open and an electric meat thermometer system of the present invention is illustrated therewith.

Turning now to a consideration of the drawings and in particular to FIG. 1, there is shown for illustrative purposes an electric, built-in wall oven 10 in which the present invention is incorporated, although it will be recognized by those skilled in this art that this invention is not limited to any particular type of oven. The oven could just as well be a gas heated oven, either domestic or commercial. This oven 10 is of standard construction having an oven cooking cavity 12 formed by a box-like oven liner 14 and a front-opening access door 16, which door is shown in this view in its horizontal, fully open position. This door 16 has a door handle 18 arranged along its top edge and hinge straps 20 at the bottom corners for hingedly supporting the door from the oven body.

The oven liner 14 has a bottom wall 22 and opposite side walls 24, 24 which are formed with rack supports or ledges 26. A slidable food supporting rack 28 is suspended between the rack supports 26. A lower baking element 30 is positioned adjacent the bottom wall 22 of the oven liner, and there would be a top broil element (not shown) positioned adjacent the top wall of the oven liner as is conventional in the electric oven art, especially domestic ovens for use in the home. The heating elements, such as baking element 30, are metal sheathed, electrical resistance heating elements of rather small diameter and of elongated length that are formed into a large loop or of large serpentine shape.

A control panel 34 is shown positioned above the oven in a frontal position to lie in substantially the same plane as the oven door 16 when in its vertical, closed position. The electrical controls of the oven are mounted in this control panel. For example, there is furnished an oven selector switch 36 which selects the various heating circuits of the oven heating elements; such as: BAKE, TIME BAKE, and BROIL. An oven thermostat 38 would also be included so as to govern the temperature within the oven cooking cavity 12. An oven timer (not shown) is also commonly furnished with the oven, but it has been left out of this description for the sake of simplicity.

The oven rack 28 supports a shallow pan 42 containing a half of ham 44 which for example is to be baked to an internal temperature of about 150°F. while the oven ambient temperature is set by the oven thermostat 38 to between 300°F. and 350°F. Obviously, larger cuts of meat must be heated for a greater length of time than smaller cuts. This variable cooking time serves to inconvenience the cook by requiring close attendance in the kitchen. The present invention alleviates this difficulty. Within the oven 10 is an electric meat thermometer system 48 comprising a needle-like meat probe 50 that has its tip inserted into the central area of the meat 44. A flexible cable 52 is carried by the other end of the probe, and the cable is of such a length that it may be connected to a wall-mounted receptacle 54 in one side wall 24 of the oven liner 14. The receptacle 54 is provided with connecting cables (not shown) which extend up behind the oven control panel 34 where they are joined with terminals of an electric meat thermometer temperature gauge 58 of the present invention. This gauge 58 is shown with a temperature scale extending from 80°F. to 200°F. There is a manually settable knob 60 and a pointer 62 that moves when the knob is turned for setting a predetermined internal temperature of the meat 44.

Figure 2:
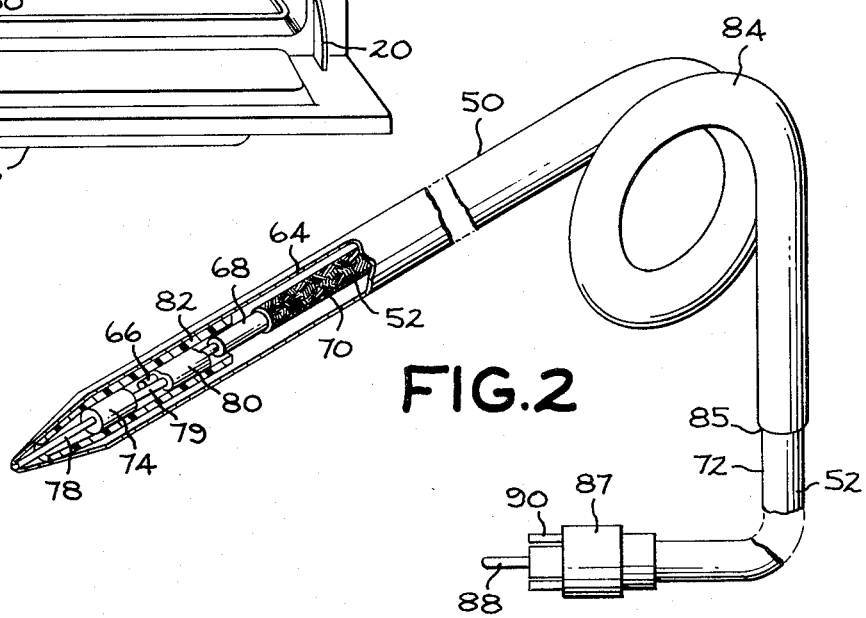
FIG. 2 is a perspective view of the temperature sensing meat probe of the present invention on an enlarged scale with a part of the metal sheath of the probe removed to illustrate the internal construction.

The temperature sensing meat probe 50 is best shown in FIG. 2 as comprising a thin wall stainless steel tubing 64 of about 3/32 inch in outside diameter such that it has the overall appearance of a knitting needle. Within the probe 50 is assembled a flexible coaxial cable 52 comprising a center conductor 66, a layer of insulation 68, and a woven outer conductor 70 of thin wire strands surrounding the insulating layer 68. This cable 52 is insulated with an outer sheath 72 of high temperature insulation such as polytetrafluoroethylene, which is commonly sold under the trademark Teflon. This coaxial cable 52 is extra-flexible and has the characteristics of a small diameter lead wire. Most of this sheath 72 has been stripped from the cable length that extends within the tubular probe 64.

A temperature sensing thermistor 74 is positioned within the free end 76 of the probe. This free end is pointed so as to facilitate the insertion of the probe into the meat. The thermistor 74 has two terminals 78 and 79 each extending longitudinally from an opposite end thereof. The outermost terminal 78 is fastened to the pointed tip 76 of the tubular probe 64, while the innermost terminal 79 is connected to the center conductor 66 of the coaxial cable 52 by means of the crimped sleeve 80. The outer conductor 70 has been stripped back from the exposed center conductor 66. An insulating sleeve 82 is assembled over the exposed portion of the cable to insulate the center conductor 66 from the tubular probe. The innermost end of the tubular probe 64 is wound into a closed loop as at 84 which serves to collapse the tube tightly into contact with the outer conductor 70 and also to seal the tube closed at the end 85 over the Teflon insulation 72. This loop 84 also serves as a hand-hold for grasping the probe and moving it around. The free end of the cable 52 is provided with an electrical plug 87 with a central pin 88 that is insulated from an overlying cylindrical split collar 90 for holding the plug in the wall mounted receptacle 54 as seen in FIG. 1.

Figure 3:
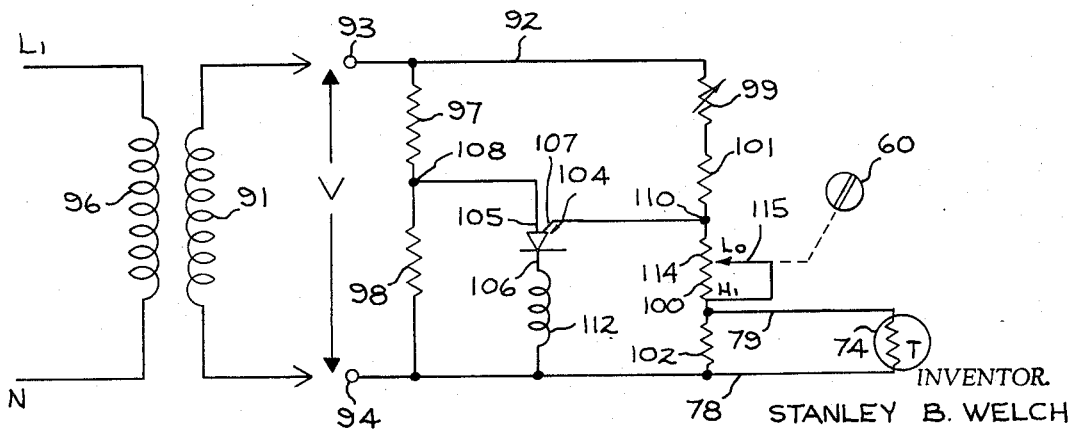
FIG. 3 is a circuit diagram of a preferred embodiment of a solid-state electric meat thermometer of the present invention.

Turning now to a consideration of the circuitry 92 of FIG. 3 the circuit includes terminals 93 and 94 for connection to a low voltage power source, such as a suitable step-down transformer 95 having a primary winding 96 and a secondary winding 91. The primary 96 would be connected to a standard electrical power source of 115 volt 60 cycle current availabe in the home between lines $L_1$ and neutral L. This transformer 95 could be a special transformer for this electric meat thermometer system 48 or this power could be tapped off of the existing transformer used for the electric oven thermostat 38. There is a first voltage divider network comprising first and second resistors 97 and 98 that are connected between terminals 93 and 94. This first voltage divider forms two legs of a Wheatstone bridge. A second voltage divider network, comprising variable resistors 99 and 100, fixed resistors 101 and 102 and finally the thermistor 74 connected in parallel with the fixed resistor 102, is also connected between the terminals 93 and 94. This second voltage divider forms the remaining two legs of the Wheatstone bridge.

A programmable unijunction transistor 104, having an anode 105, a cathode 106 and a gate 107, has its anode connected to the point 108 in common between the first and second resistors 97 and 98 of the first voltage divider network. The gate 107 of the programmable unijunction transistor 104 is connected to a common point 110 between resistors 100 and 101. The cathode 106 of the transistor 104 is connected through the coil 112 of a signal buzzer to terminal 94. The characteristics of the programmable unijunction transistor 104 are that when the gate potential is greater than the anode potential by approximately 0.5 volts, the impedance of the transistor between all of its terminals is very high; and, conversely when the gate potential is less than 0.5 volts more than the anode potential, the anode to cathode impedance and the gate to cathode impedance drops to a very low value. Thus, the programmable unijunction transistor 104 functions as a detector for the bridge circuit, as described above.

The desired temperature of the meat 44 when fully cooked is preset by the control knob 60 on the control panel 34 which is associated with the variable resistor 100, which is a setting rheostat, which includes a resistor element 114 and an arm 115 which is movable across the resistor element 114 upon the rotation of the control knob 60. Combined with the control knob 60 is the temperature gauge 58 and the pointer 62 which moves only when the knob 60 is turned. This electric meat thermometer system is a "slide back" system which sounds the buzzer 112 when the internal meat temperature reaches the set temperature, but does not indicate the existing temperature directly. In use, the operator sets the desired temperature by turning the knob 60 to move the pointer 62. Then when the meat temperature reaches the preset temperature, the buzzer sounds to warn the operator to turn off the heating means and remove the meat from the oven. Should the operator desire to know the temperature of the meat during the cooking cycle, she may determine this by moving pointer 62 down the temperature scale until the buzzer sounds, and then reading the temperature indicated by the position of the pointer 62.

The value of the variable resistor 114 is set so that the anode-cathode voltage of the programmable unijunction transistor 104 exceeds its gate-cathode voltage by just enough to fire the programmable unijunction transistor, when a temperature sensitive variable resistor, such as the thermistor 74, reaches a value which corresponds to the temperature set by the pointer 62; and hence, the movable arm 115 of the control knob 60. The transistor 104 conducts when the voltage of the anode exceeds that of the gate by approximately 0.5 volts. Upon conduction, both the gate and anode potentials fall to a value on the order of 1 volt greater than the cathode voltage. Current through the buzzer coil 112 is limited by the coil's impedance and that of resistor 97, while the gate current is limited by resistors 99 and 101. Hence, it can be seen that the circuit is critical when the instantaneous applied voltage is a maximum. This occurs at the peak of the positive half wave. As a result, the buzzer coil 112 is energized with one-quarter wave power. Since the buzzer coil 112 is a power device and the allowable buzzer current is limited by the characteristics of the transistor 104, resistor 97 is made of a low value and the anode voltage divider ratio is made high (about 0.66).

The second voltage divider contains the thermistor 74 and the setting rheostat 100 in the lower portion of the bridge. A thermistor shunt resistor 102 is included to linearize the thermistor characteristics so as to yield a reasonably linear temperature scale 58. At the critical point, the equivalent resistance of these resistors 100, 74 and 102 is always some constant value. The circuit is calibrated to be critical at this value by means of the variable resistor 99 in the upper leg of the second voltage divider network.

The setting of the control knob 60 provides the setting rheostat 100 with a resistance value such that the firing of the programmable unijunction transistor 104 will coincide with the reaching of the preset internal meat temperature, which is being sensed by the thermistor 74 in the tip of the meat probe 50. Until the programmable unijunction transistor 104 fires, current will flow substantially through two paths comprising the first voltage divider 97 and 98 and the second voltage divider comprising variable resistor 99, fixed resistor 101, settable rheostat 100 and the parallel combination of thermistor 74 and the fixed shunt resistor 102. As the temperature of the meat increases, the resistance of the thermistor 74 decreases. This causes the gate-cathode voltage of the programmable unijunction transistor 104 to decrease with respect to the anode-cathode voltage of the transistor. Once the gate voltage reaches a predetermined value, such as, for example, 0.5 volts less than the anode voltage, the programmable unijunction transistor will conduct. As the programmable unijunction transistor conducts, current is directed through the signal buzzer coil 112 to actuate the buzzer and give an audible signal that the predetermined temperature has been reached within the interior of the meat.

The circuit components of the present invention are easily adapted to be mounted upon a printed circuit board (not shown). Also, there would be sufficient space on the printed circuit board to mount the temperature indicating dial 58 thereon, as well as to provide a simplified interconnection between the cable 52 of the meat probe 50 and the printed circuit board.

While the present embodiment utilizes a first voltage divider of resistors 97 and 98 to transmit power from the secondary 91 of the transformer to the circuitry of the present invention, it will be obvious to those skilled in this art that anode 105 of the programmable unijunction transistor 104 may be connected directly to a point on the secondary winding 91 of the transformer 95.

It will thus be understood that I have provided an accurate and simplified solid state meat thermometer system utilizing a programmable unijunction transistor for ultimately sensing the temperature of a meat probe and actuating a signal buzzer to indicate that a predetermined temperature has been reached within the meat.

The following are suggested values for the components of the illustrated embodiment of the present invention:

| | |
|---|---|
| Resistor 97 | 22 ohms |
| Resistor 98 | 47 ohms |
| Transistor 104 | G.E. Model No. 13T1 |
| Coil 112 | 50 ohms |
| Rheostat 100 | 18.5 ohms/degree |
| Resistor 102 | 2.7 kohms |
| Thermistor 74 | 10 kohms at 77°F. |
| Resistor 99 | 600 ohms |
| Resistor 101 | 910 ohms |

It is well known to those skilled in this art that the value of the components will vary depending upon the value of the voltage applied from the power source.

Modifications of this invention will occur to those skilled in this art, therefore, it is to be understood that this invention is not limited to the particular embodiment disclosed, but that it is intended to cover all modifications which are within the true spirit and scope of this invention as claimed.

What is claimed as new and desired to be secured by Letters Patent of the United States is:

1. Apparatus for monitoring the temperature of food being cooked, comprising:
    means for connecting said apparatus to a power source;
    a probe including variable resistance temperature sensing means;
    signal alarm means; and
    comparing means including a programmable unijunction transistor serving both as a null detector for said comparing means and as a load current carrying means for said alarm means;
    said comparing means having an input connected to said probe for sensing the temperature of the probe, and an output connected to said signal alarm means, and said comparing means including means for establishing a reference level functionally related to a temperature at which said alarm activates when said probe reaches said temperature.

2. The combination as defined in claim 1 wherein said programmable unijunction transistor includes an anode, a cathode, and a gate, said signal alarm means being connected between said cathode of said programmable unijunction transistor and a reference potential, said means for establishing a reference level functionally related to a temperature at which said alarm activates, and said variable resistance temperature sensing means being connected between said gate of said programmable unijunction transistor and said reference potential.

3. The combination as defined in claim 2 wherein said means for establishing a reference level functionally related to the temperature at which said alarm activates includes a resistor, an arm and an indicator dial, including temperature markings whereby movement of said indicator dial determines the position of said arm on said resistor to provide a resistance value such that the firing of said programmable unijunction transistor will correspond to a temperature marked on said indicator dial.

4. The combination as defined in claim 3 wherein said probe comprises a high temperature insulated coaxial cable having concentric inner and outer conductors and a hollow conductive tube surrounding one end of said coaxial cable, said hollow conductive tube being partially coiled at an end thereof, said probe further including a variable resistance temperature sensing means situated in the free end of said hollow tube, said variable resistance temperature sensing means further having a first terminal connected to said inner conductor and second terminal connected to said outer conductor through said hollow conductive tube.

5. The combination as defined in claim 4 wherein said variable resistance temperature sensing means comprises a thermistor having a negatively sloping temperature-resistance characteristic.

6. The combination as defined in claim 1 wherein said programmable unijunction transistor includes an anode, a cathode, and a gate, said signal alarm means being connected between said cathode of said programmable unijunction transistor and a reference potential, and a first voltage divider network joining said anode to the said power source, and a second voltage divider network joining said gate through said variable resistance temperature sensing means to the said power source, where the two voltage divider networks form the legs of a Wheatstone bridge such that the programmable unijunction transistor functions as a detector for the bridge circuit.

7. The combination as defined in claim 6 wherein the power source is a low power source and the said second voltage divider network contains in one leg the said variable resistance temperature sensing means in the form of a relatively small sensing thermistor without excessive self-heating error, as well as a mnaually settable variable resistor means.

8. The combination as defined in claim 1 wherein the said probe is an elongated needle-like member connected on one end of a small extra-flexible coaxial cable, the said variable resistance temperature sensing means being in the form of a relatively small sensing thermistor fitted into the tip of the probe and series connected in the said cable, the outer surface of the cable being insulated with a layer of polytertrafluoroethylene.

9. The combination as defined in claim 6 wherein the said first voltage divider network is a relatively low impedance, high energy circuit for energizing the said signal alarm means while the second voltage divider network is a relatively high impedance low energy circuit to accommodate a relatively small sensing thermistor as the temperature sensing means without excessive self-heating error.

* * * * *